US 11,585,299 B2

(12) United States Patent
Lucka et al.

(10) Patent No.: US 11,585,299 B2
(45) Date of Patent: Feb. 21, 2023

(54) SYSTEM AND METHODS FOR A FUEL TANK PRESSURE CONTROL PUMP

(71) Applicant: DAYCO IP HOLDINGS, LLC, Roseville, MI (US)

(72) Inventors: Kevin W. Lucka, Southfield, MI (US); Donald P. Tinsley, III, Huntington Woods, MI (US); Matthew C. Gilmer, South Lyon, MI (US)

(73) Assignee: Dayco IP Holdings, LLC, Roseville, MI (US)

( * ) Notice: Subject to any disclaimer, the term of this patent is extended or adjusted under 35 U.S.C. 154(b) by 0 days.

(21) Appl. No.: 17/676,945

(22) Filed: Feb. 22, 2022

(65) Prior Publication Data

US 2022/0268243 A1 Aug. 25, 2022

Related U.S. Application Data

(60) Provisional application No. 63/151,940, filed on Feb. 22, 2021.

(51) Int. Cl.
  *F02M 25/08* (2006.01)
  *B60K 6/24* (2007.10)
(52) U.S. Cl.
  CPC .......... *F02M 25/0818* (2013.01); *B60K 6/24* (2013.01); *F02M 25/0836* (2013.01); *F02M 25/0854* (2013.01)
(58) Field of Classification Search
  CPC .......... F02M 25/0818; F02M 25/0836; F02M 25/0854; Y02T 10/62
  See application file for complete search history.

(56) References Cited

U.S. PATENT DOCUMENTS

| 9,388,775 B2 | 7/2016 | Bolger et al. |
| 9,534,704 B2 | 1/2017 | Hampton et al. |
| 9,587,595 B2 | 3/2017 | Woods et al. |
| 9,689,325 B2 | 6/2017 | Nanba et al. |
| 9,827,963 B2 | 11/2017 | Fletcher et al. |
| 9,879,623 B2 | 1/2018 | Dekar et al. |
| 2013/0074583 A1 | 3/2013 | Perry |

(Continued)

OTHER PUBLICATIONS

International Search Report and Written Opinion in International Patent Application No. PCT/US2022/017137 dated May 23, 2022, pp. 6.

*Primary Examiner* — Xiao En Mo
(74) *Attorney, Agent, or Firm* — FisherBroyles, LLP; Susan M. Oiler

(57) ABSTRACT

Systems for hybrid electric engines have a fuel vapor canister (FVC) in fluid communication with (i) fuel vapor in a fuel tank with a refueling valve therebetween, (ii) an intake manifold with a canister purge valve therebetween, and (iii) atmospheric pressure (atm) with a canister vent valve (CVV) therebetween, a bypass loop around the refueling valve, and a pressure sensor upstream of both the refueling valve and the CVV. The loop has a control pump and a control valve controlling fluid communication with atm, and in a first mode, control valve and CVV open, pumps fuel vapor to the FVC for pressure control, then closes the control valve; in a second mode, control valve closed and CVV open, pumps atm to the FVC; and in a third mode, control valve and CVV open, pumps fuel vapor to the FVC to a pre-selected threshold to close the CVV.

6 Claims, 6 Drawing Sheets

(56) References Cited

U.S. PATENT DOCUMENTS

| | | | |
|---|---|---|---|
| 2014/0245997 A1 | 9/2014 | Zhelyaskov et al. | |
| 2015/0198103 A1* | 7/2015 | Dudar | F02M 25/0809 |
| | | | 701/102 |
| 2015/0198123 A1* | 7/2015 | Pearce | F02M 25/0809 |
| | | | 123/520 |

* cited by examiner

SYSTEM AND METHODS FOR A FUEL TANK PRESSURE CONTROL PUMP

RELATED APPLICATIONS

This application claims priority to U.S. Provisional Application No. 63/151,940, filed Feb. 22, 2021, the entirety of which is incorporated herein by reference.

TECHNICAL FIELD

This application relates to a vehicle evaporative emissions system that includes a tank pressure control pump (TPCP) to assist with purging the carbon canister, managing the fuel vapor pressure within the fuel tank, and creating a system vacuum while performing a system leak diagnostic, more particularly a system in which the TPCP is positioned in a bypass loop around a refueling valve for fluid communication between the fuel tank vapor dome and the fuel vapor carbon canister.

BACKGROUND

Most Hybrid Electric Vehicles (HEVs) and Plug-In Hybrid Electric Vehicles (PHEVs) have a system that use a Fuel Tank Isolation Valve (FTIV) that allows vapor to flow from the fuel tank to the canister during refueling, but also manages the pressure within the fuel tank. The HEV and PHEV evaporative systems need to be able to detect any leaks (per EPA and Carbon emission regulations), which is commonly performed with an Electronic Leak Check Module (ELCM), which consists of an orifice, change over valve, pump, and pressure transducer.

Purge pumps have been included in evaporative emission systems at a location between the fuel vapor canister and the canister purge valve or between the atmosphere and the fuel vapor canister. This is primarily due to the purge pump only having one primary function, which is either to pull vapor from the fuel vapor canister and push it into the intake manifold or to pull fresh air from atmosphere and push it through the fuel vapor canister to increase the amount of flow across the carbon material within the canister and purge more into the intake manifold.

There is a need for a simpler device and system, more cost effective means for leak detection in HEV and PHEV systems, and less failure modes resulting from less interactions within the system.

SUMMARY

In all aspects, fuel vapor management systems are disclosed for a hybrid electric internal combustion engine having an intake manifold. The system has a fuel tank in fluid communication with the internal combustion engine, a fuel vapor canister in fluid communication with fuel vapor in the fuel tank, in fluid communication with the intake manifold, and in fluid communication with atmospheric pressure, a refueling valve controlling the fluid communication between the fuel tank and the fuel vapor canister, a canister vent valve controlling fluid communication between the fuel vapor canister and atmospheric pressure, a canister purge valve controlling fluid communication between the fuel vapor canister and the intake manifold, and a bypass loop around the refueling valve. The bypass loop has a tank pressure control pump and has a control valve. The control valve controls fuel vapor flow through the bypass loop and into the tank pressure control pump. The bypass loop is in fluid communication with atmospheric pressure through a conduit having at a first junction with the bypass loop at a position between the control valve and the tank pressure control pump and having a second junction with atmosphere at a position between the fuel vapor canister and the canister vent valve, and having a check valve controlling fluid flow therein.

The system includes a first pressure sensor sensing pressure upstream of both the bypass loop and the refueling valve and a second pressure sensor sensing pressure between the fuel vapor canister and the canister vent valve. The tank pressure control pump in (i) a first mode of operation, with the control valve and the canister vent valve both open, pumps fuel vapor to the fuel vapor canister for fuel tank pressure control, then closes the control valve, in (ii) a second mode of operation, with the control valve closed and the canister vent valve open, pumps atmospheric pressure to the fuel vapor canister as a purge assist function, and in (iii) a third mode of operation, with the control valve and the canister vent valve both open, pumps fuel vapor to the fuel vapor canister to draw down a vacuum to a pre-selected first pressure threshold at which the canister vent valve is to close as a leak diagnostic function. During the third mode of operation, if the canister vent valve fails to close at the pre-selected first pressure threshold, an indicator is activated to indicate that a leak has been detected. Further, during the third mode of operation, the canister vent valve closes at a pre-selected first pressure threshold, which seals the system, and once pressure stabilization occurs, the control valve closes and the first and the second pressure sensors monitor pressure against respective pre-selected second and third pressure thresholds for leak detection proximate the tank or proximate the fuel vapor canister.

The system can include a turbocharger in the engine system, a Venturi device for creating vacuum in a bypass loop around the compressor of the turbocharger, and a suction port of the Venturi device in fluid communication with the fluid flow from the fuel vapor canister to the intake manifold upstream of the canister purge valve.

DETAILED DESCRIPTION

Figure 1:
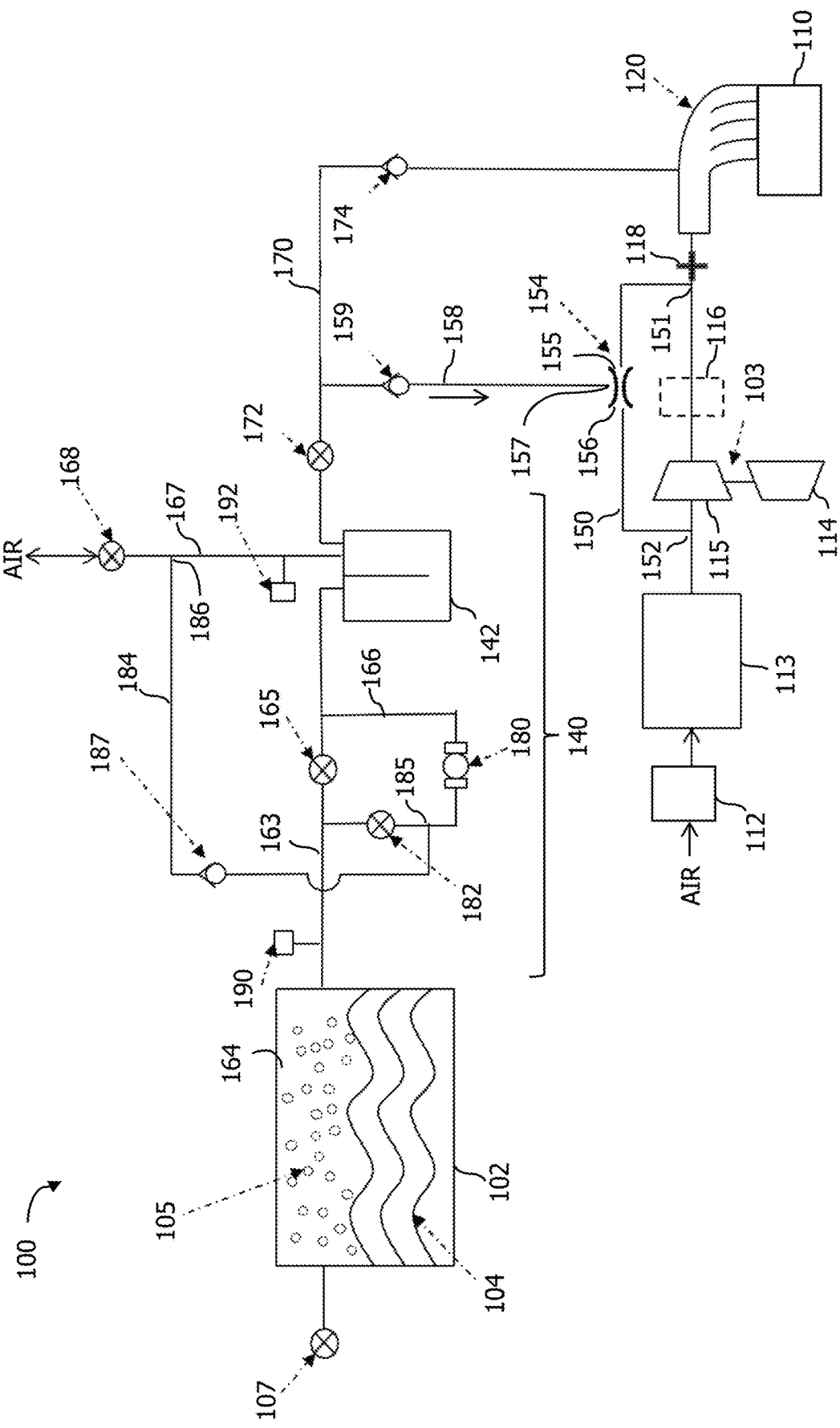
FIG. 1 is a schematic illustration of a hybrid electric vehicle fuel vapor system.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

All the needs discussed in the background section are satisfied by the hybrid engine fuel vapor management system disclosed herein that positions a tank pressure control pump in a bypass loop around a refueling valve that controls fluid communication between the fuel tank dome and the fuel vapor canister. The tank pressure control pump has three modes of operation: i) fuel tank pressure control (protection against rupture); ii) fuel vapor canister purge assist, and iii) leak diagnostics of the system as a whole and the fuel vapor canister side and the fuel tank side of the system. Control valves are commanded valves in contrast to check valves which open under system pressures.

Referring now to FIG. 1, a hybrid engine system 100, which is a turbocharged or supercharged system having a turbocharger, a supercharger or the like, referred to herein collectively as turbocharger 103, is shown. However, in other embodiments, (not shown), the engine system can be a naturally aspirated engine. The engine system 100 is configured for combusting liquid fuel 104 and/or fuel vapor 105 from a fuel tank 102 which accumulates in at least one component thereof and includes a multi-cylinder internal combustion engine 110. The engine system 100 receives air from an air intake 112, which may include an air filter 113 (also known as an air cleaner). The turbocharger 103 has a turbine 114 operating a compressor 115, which receives air from the air intake 112, compresses the air, and directs a flow of compressed air (or boosted air) downstream through an optional charge air cooler or intercooler 116 and then to a throttle 118. In alternative embodiments, the intercooler 116 may be positioned downstream of the throttle, and as such, may be housed in the intake manifold. The throttle 118 controls fluid communication between the compressor 115 and the intake manifold 120 of the engine 110. The throttle 118 is operable using known techniques to vary an amount of intake air provided to the intake manifold 120 and the cylinders of the engine. Intake manifold 120 is configured to supply intake air or an air-fuel mixture to a plurality of combustion chambers of engine 110 located within the engine block. The combustion chambers are typically arranged above a lubricant-filled crankcase such that reciprocating pistons of the combustion chambers rotate a crankshaft (not shown) located in the crankcase.

The fuel tank 102 is a reservoir for holding fuel 104, 105 to be supplied to the internal combustion engine 110 via a fuel deliver system such as a fuel pump (not shown) and includes a filler neck 107. A controller can regulate the operation of the engine and its fuel delivery and/or the evaporative emissions. A bypass conduit 150 is included around the turbocharger 103. The bypass conduit 150 in FIG. 1 has an entrance 151 downstream of the compressor 115 and upstream of the throttle 118 and has an exit 152 upstream of the compressor 115. The entrance 151 may be upstream or downstream of the intercooler 116. The bypass conduit 150 includes a Venturi device 154 for generating vacuum. The Venturi device 154 has a motive entrance 155 in fluid communication with the entrance 151, a discharge exit 156 in fluid communication with the exit 152, and a suction portion 157 in fluid communication with the fuel tank 102 and the purge canister 142 via a suction conduit 158. The Venturi device 154 may have the particulars of any of the devices in any of Applicant's applications or granted patents, for example but not limited to U.S. Pat. Nos. 9,827,963 and 9,534,704, and may include an integral check valve 159 preventing flow from the Venturi device 154 through the suction port 157 toward the fuel tank 102. Otherwise, the check valve 159 may be a separate check valve in the suction conduit 158.

Here, the fuel tank 102 is operatively connected to an evaporative emissions control system 140. The fuel vapor canister 142 is connected to the fuel tank 102 for fluid communication therewith through a first conduit 163 having a refueling control valve 165, which controls the fluid communication therebetween. The first conduit 163 provides fluid communication of vapors in a head space 164 within the fuel tank 102 and the fuel vapor canister 142. The fuel vapor canister 142 has a second (fresh air) conduit 167 in fluid communication with air or atmosphere. A canister vent valve 168 is present in the second conduit 167 and controls the fluid communication between the fuel vapor canister 142 and the air. The fuel vapor canister 142 has a third (vapor) conduit 170 in fluid communication with the intake manifold 120. A canister purge valve 172 controls the fluid communication from the purge canister 142 to the engine's intake manifold 120. The canister purge valve 172 can be a high restriction flow and metered flow valve. The vapor conduit 170 may also include a vapor check valve 174 preventing flow from the intake manifold 120 toward the fuel tank 102. Fuel vapors enter the fuel vapor canister 142 through the first conduit 163 and, after being acted upon by the charcoal or other adsorbent material therein, exit the fuel vapor canister through the fresh air conduit 167.

Still referring to FIG. 1, the evaporative emissions control system 140 includes a tank pressure control pump 180 positioned in fluid communication between the fuel tank 102 and the fuel vapor canister 142, more specifically in a bypass loop 166 around the refueling control valve 165. A control valve 182 controls fuel vapor flow through the bypass loop 166 and into the tank pressure control pump 180. The bypass loop 166 is in fluid communication with the atmosphere/fresh air through a fresh air conduit 184 having a first junction 185 with the bypass loop 166 positioned between the control valve 182 and the tank pressure control pump 180 and a second junction 186 between the fuel vapor canister 142 and the canister vent valve 168. The fresh air conduit 184 has a check valve 187 controlling fluid flow therein, i.e., prevents fuel vapors from leaking to the atmosphere.

The evaporative emissions control system 140 includes a first pressure sensor 190 sensing pressure upstream of the bypass loop 166 and the refueling valve 165 and a second pressure sensor 192 sensing pressure between the fuel vapor canister 142 and the canister vent valve 168. The first pressure sensor 190 is one that detects high pressures such as those that build up in the fuel tank 102. The second pressure sensor 192 is one that detects low pressures. The pressure sensors may be pressure transducers.

The tank pressure control pump 180 which is positioned between the fuel tank 103 and the fuel vapor canister in bypass loop 166 eliminates the need for a fuel tank isolation valve and an electronic leak check module. In operation, the tank pressure control pump has a plurality of modes: (i) a first mode of operation, with the control valve and the canister vent valve both open, pumps fuel vapor to the fuel vapor canister for fuel tank pressure control, then closes the control valve; (ii) a second mode of operation, with the control valve closed and the canister vent valve open, pumps atmospheric pressure to the fuel vapor canister as a purge assist function; and (iii) a third mode of operation, with the control valve and the canister vent valve both open, pumps fuel vapor to the fuel vapor canister to draw down a vacuum to a pre-selected first pressure threshold at which the canister vent valve is to close as a leak diagnostic function. Each mode is repeatable as needed to maintain the engine system.

Figure 2:
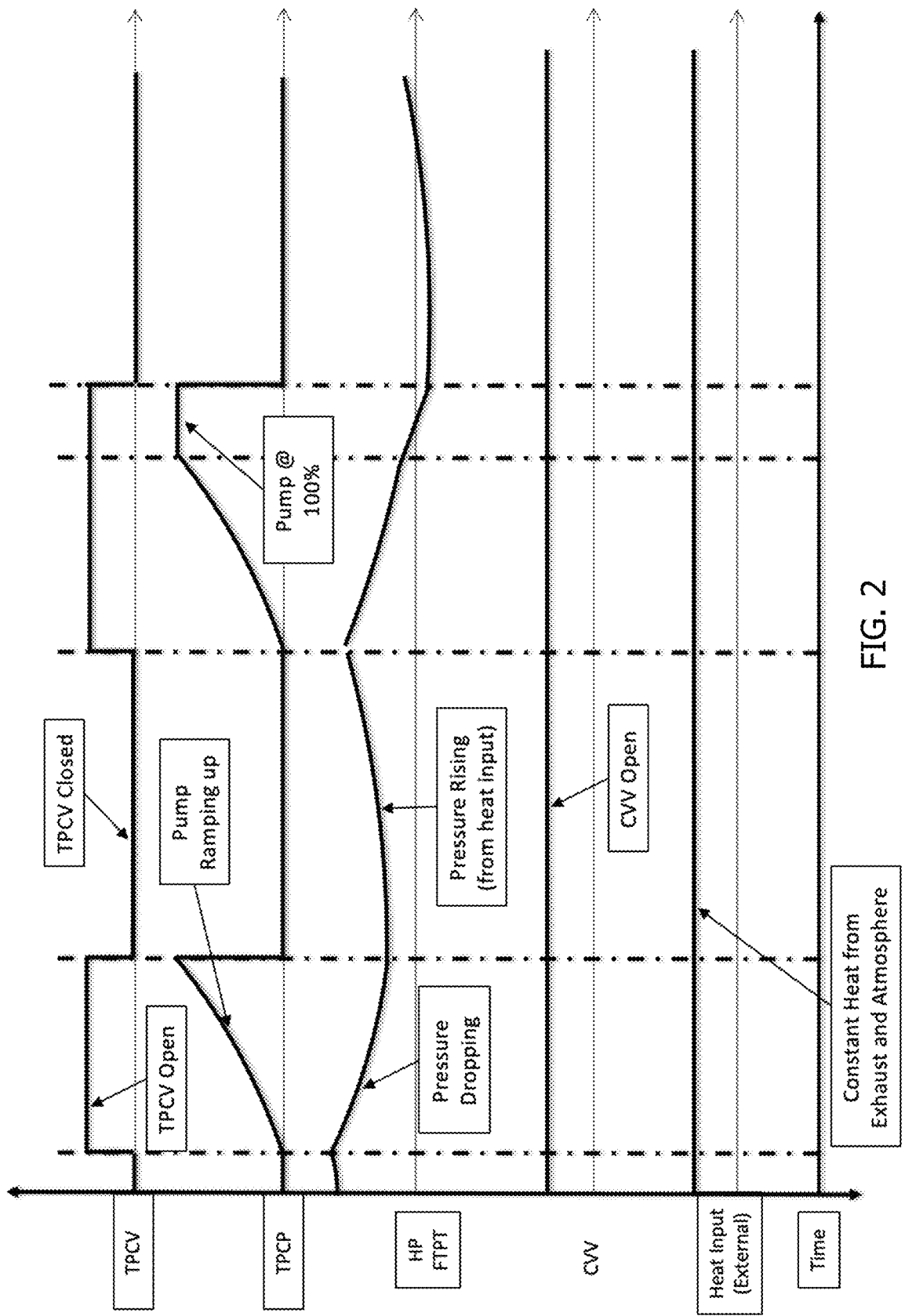
FIG. 2 is a first graph of tank pressure control interactions.

The first mode is demonstrated by the tank pressure control system interactions shown in FIG. 2, which alleviates high pressure within the fuel tank to protect the fuel tank's structural integrity. The tank pressure control valve 182 will open and allow a flow path from the fuel tank 102 to the tank pressure control pump 180. The tank pressure control pump 180 will pump out some of the fuel vapor from the tank to the canister while the tank pressure control valve 182 is open and the pump is running.

Figure 3:
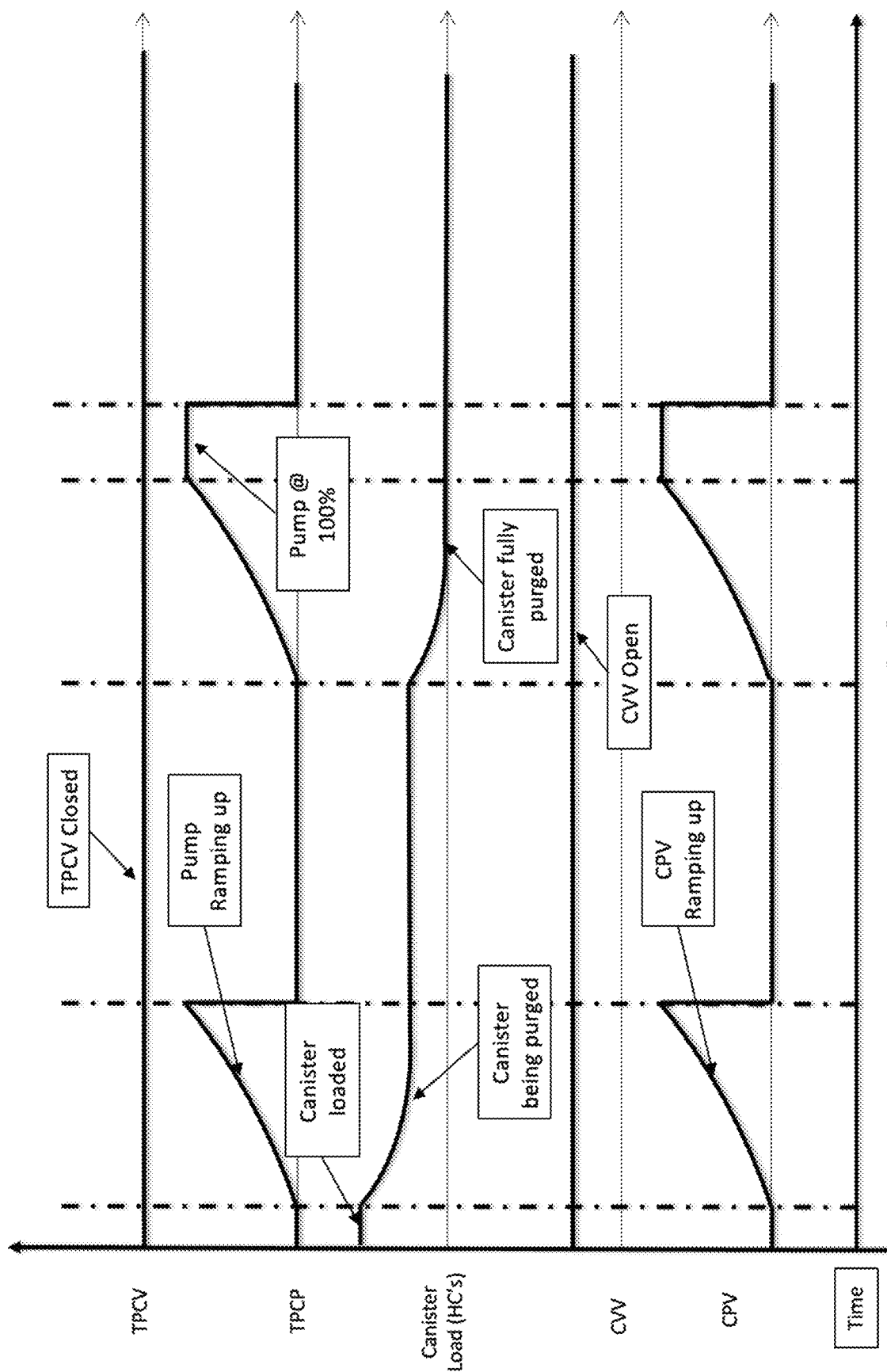
FIG. 3 is a graph of pressure control interactions when a tank pressure control pump is acting under a purge assist function.

The second mode is demonstrated by the tank pressure control system interactions shown in FIG. 3, which is a purge assist mode for the fuel vapor canister 142. When the tank pressure control valve 182 is closed, the tank pressure control pump 180 can pull in fresh air from the atmospheric through the check valve 187. The fresh air drawn through this line allows the fuel vapor canister to purge vapor with fresh air instead of more fuel vapor from the fuel tank 102, performing the function of a traditional purge pump located on the fresh air side of the canister.

Figure 4:
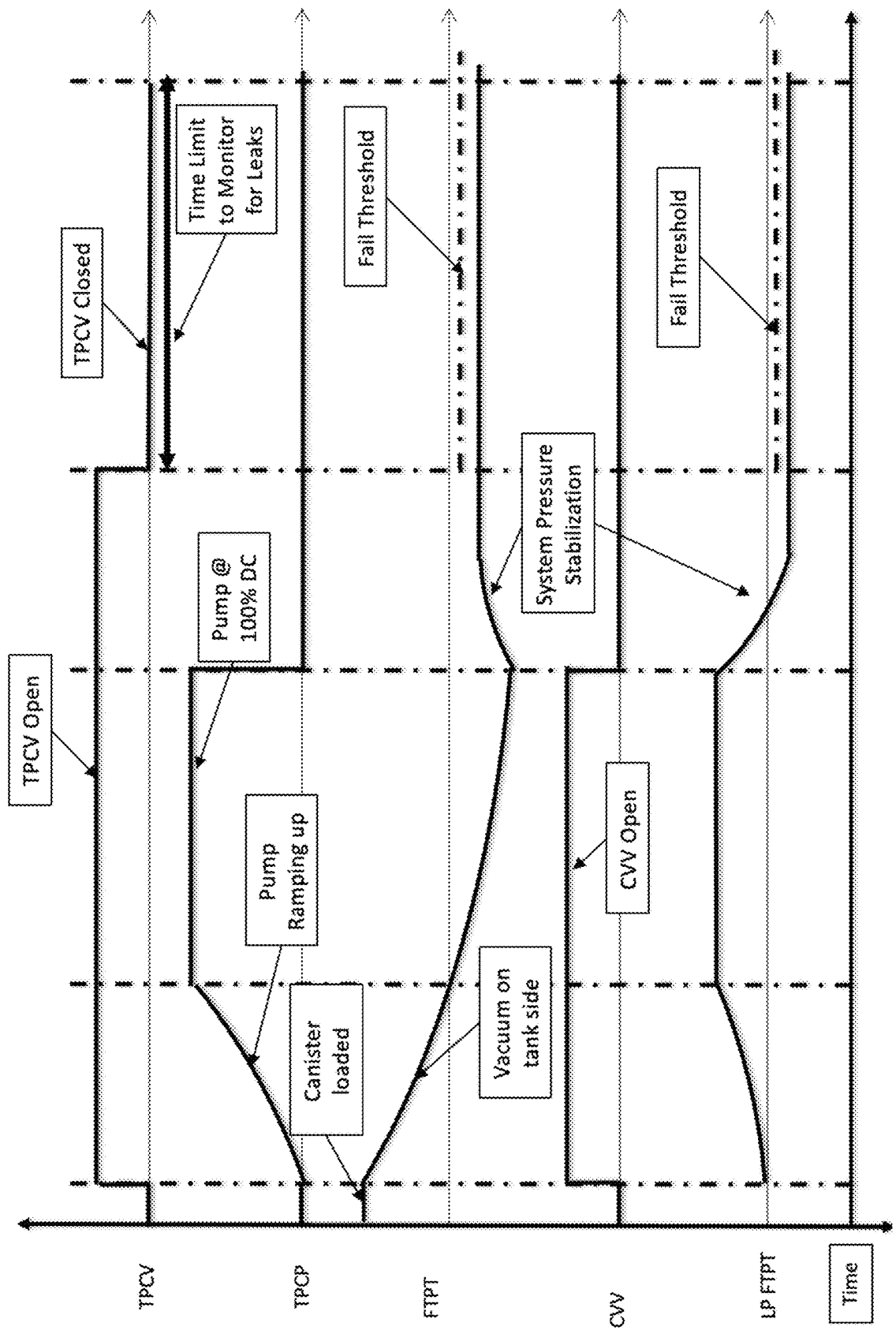
FIG. 4 is a graph of pressure control interactions when the tank pressure control pump is acting under a leak detection function with no leak present.
Figure 5:
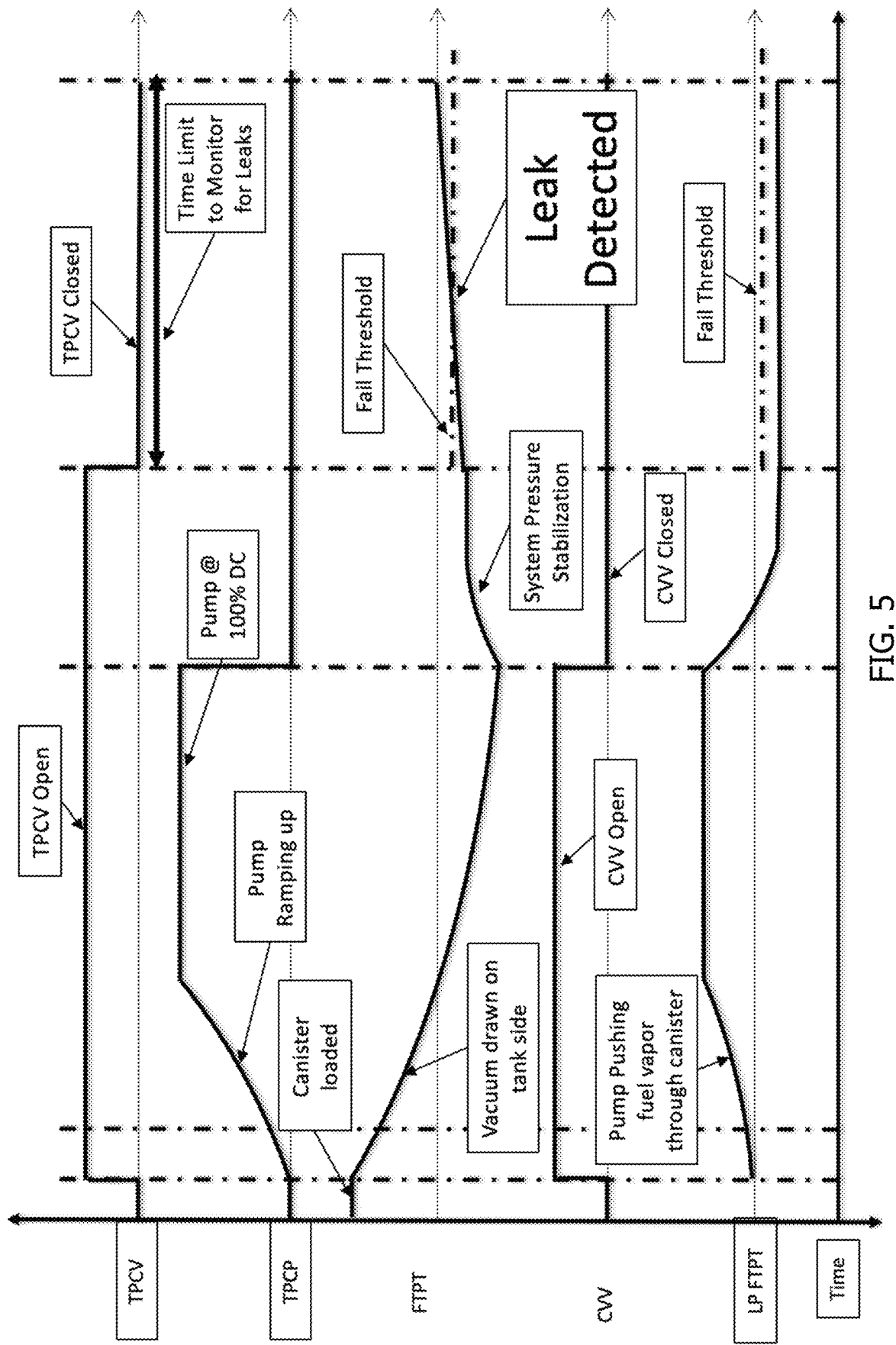
FIG. 5 is a graph of pressure control interactions when the tank pressure control pump is acting under a leak detection function with a leak present on the fuel tank side of the system.
Figure 6:
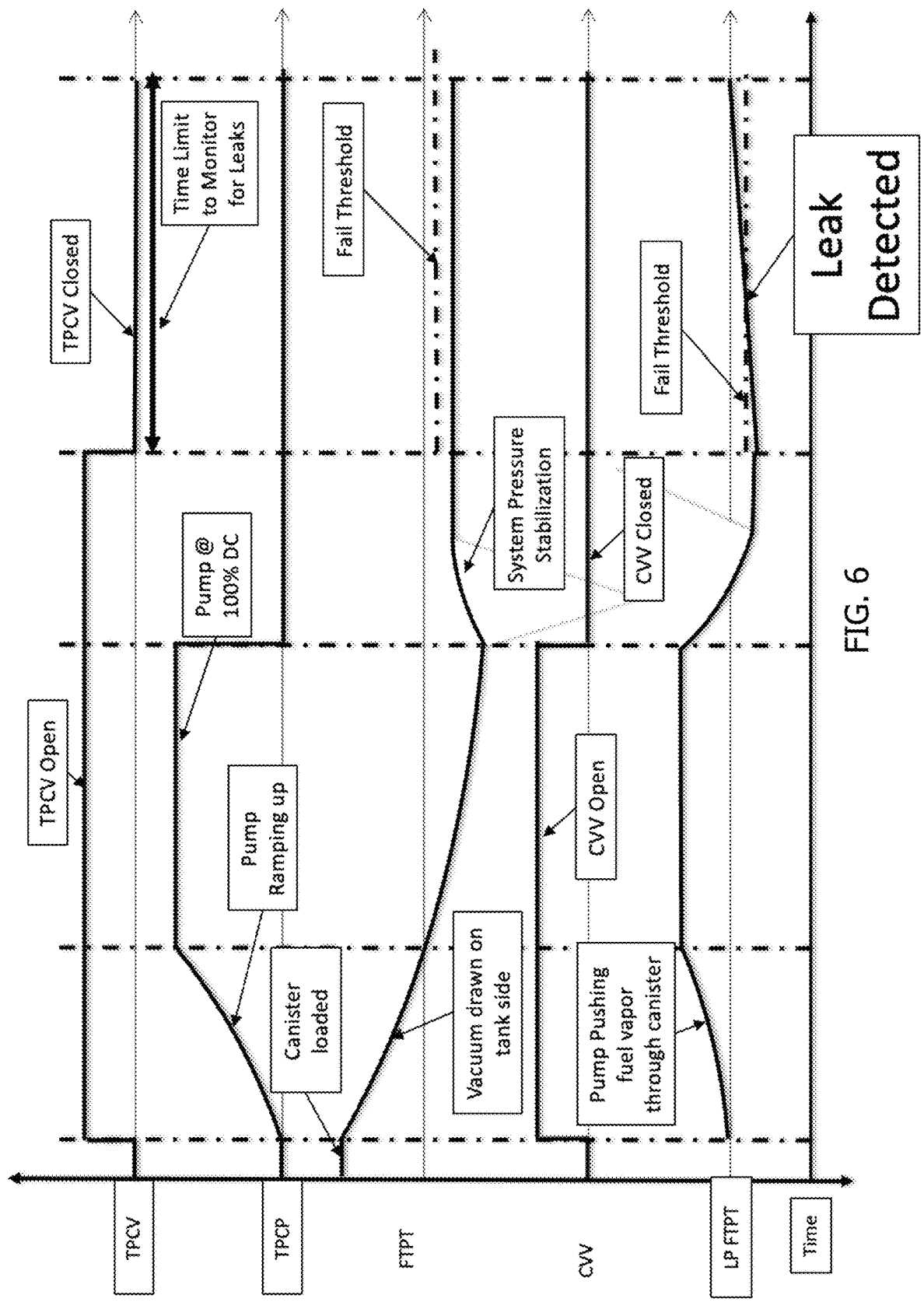
FIG. 6 is a graph of pressure control interactions when the tank pressure control pump is acting under a leak detection function with a leak present on the vapor canister side of the system.

Various aspects of the third mode, leak diagnostics, are demonstrated by the tank pressure control system interactions shown in FIGS. 4-6. FIG. 4 is a full system leak diagnostic showing a system that passed the leak diagnostic test. FIG. 5 is a leak diagnostic showing that the canister side, i.e., the second pressure sensor, passed the test, but the tank side, i.e., the first pressure sensor, failed the test. FIG. 6 is a leak diagnostic showing that the canister side failed the test, but the tank side passed the test.

In the third mode, the tank pressure control pump 180 serves the function of a leak diagnostic pump. The canister vent valve 168 and tank pressure control valve 182 will open, allowing flow from the fuel tank 102 to the fuel vapor canister 142 and then to atmosphere through the canister vent valve 168. The tank pressure control pump 180 will run and draw down a vacuum to a pre-selected initial target, then the canister vent valve 168 will close and the system will become sealed. If the tank pressure control pump 180 is unable to pull down the fuel tank pressure to the pre-selected initial target, then it can be considered that there is a large leak in the system and the diagnostic system will indicate the leak, for example, by activating the Malfunction Indication Light or Check Engine Light. The tank pressure control valve 182 will close after the system stabilizes to a certain vacuum level, then the tank pressure control valve 182 will close. Pressure will be monitored for leaks by the low pressure transducer (second pressure sensor 192) on the canister side of the tank pressure control pump 180 and refueling valve 165, and then pressure can be monitored for leaks on the fuel tank side with the high pressure transducer (first pressure sensor 190).

A tank pressure control pump has a simpler design than an electronic leak check module. There are more individual components in the disclosed system, but they have less failure modes due to less interactions within the system, i.e., fewer interfaces between components. The disclosed system reduces the weight and cost of the components needed to carry out the same functions.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. A fuel vapor management system comprising:
a hybrid electric internal combustion engine having an intake manifold;
a fuel tank in fluid communication with the internal combustion engine;
a fuel vapor canister in fluid communication with fuel vapor in the fuel tank, in fluid communication with the intake manifold, and in fluid communication with atmospheric pressure;
a refueling valve controlling the fluid communication between the fuel tank and the fuel vapor canister;
a canister vent valve controlling fluid communication between the fuel vapor canister and atmospheric pressure;
a canister purge valve controlling fluid communication between the fuel vapor canister and the intake manifold;
a bypass loop around the refueling valve has a tank pressure control pump and a control valve, wherein the control valve controls fuel vapor flow through the bypass loop and into the tank pressure control pump, wherein the bypass loop is in fluid communication with atmospheric pressure through a conduit having a first junction with the bypass loop, having a second junction between the fuel vapor canister and the canister vent valve, and having a check valve controlling fluid flow therein, wherein the first junction is positioned between the control valve and the tank pressure control pump;
a first pressure sensor sensing pressure upstream of the bypass loop and the refueling valve and a second pressure sensor sensing pressure between the fuel vapor canister and the canister vent valve;
wherein the tank pressure control pump in (i) a first mode of operation, with the control valve and the canister vent valve both open, pumps fuel vapor to the fuel vapor canister for fuel tank pressure control, then closes the control valve, in (ii) a second mode of operation, with the control valve closed and the canister vent valve open, pumps atmospheric pressure to the fuel vapor canister as a purge assist function, in (iii) a third mode of operation, with the control valve and the canister vent valve both open, pumps fuel vapor to the fuel vapor canister to draw down a vacuum to a pre-selected first pressure threshold at which the canister vent valve is to close as leak diagnostic function.

2. The system of claim 1, wherein in the third mode of operation, if the canister vent valve fails to close at the pre-selected first pressure threshold, a leak is detected.

3. The system of claim 1, wherein in the third mode of operation, the canister vent valve closes at the pre-selected first pressure threshold, which seals the system and once pressure stabilization occurs, the control valve closes and the first and the second pressure sensors monitor pressure against respective pre-selected second and third pressure thresholds for leak detection proximate the tank or proximate the fuel vapor canister.

4. The system of claim 1, wherein the internal combustion engine has a turbocharger.

5. The system of claim 4, comprising a Venturi device for creating vacuum in a bypass loop around the compressor of the turbocharger.

6. The system of claim 5, wherein a suction port of the Venturi device is in fluid communication with the fluid flow from the fuel vapor canister to the intake manifold upstream of the canister purge valve.

* * * * *